United States Patent [19]

de Gennes

[11] 4,069,905

[45] Jan. 24, 1978

[54] ASSEMBLY UNIT FOR A CLUTCH, ESPECIALLY FOR THE CLUTCHES OF AUTOMOBILE VEHICLES

[75] Inventor: Gerard de Gennes, Senlis, France

[73] Assignee: Societe Anonyme Francaise du Ferodo, Paris, France

[21] Appl. No.: 656,740

[22] Filed: Feb. 9, 1976

[30] Foreign Application Priority Data

Feb. 13, 1975 France .............................. 75.04432
Jan. 23, 1976 France .............................. 76.01779

[51] Int. Cl.$^2$ ............................................. F16D 13/56
[52] U.S. Cl. .................................. 192/112; 192/70.18; 192/89 B

[58] Field of Search .............. 192/70.18, 70.28, 70.29, 192/70.3, 89 B, 112

[56] References Cited

U.S. PATENT DOCUMENTS

| 3,061,062 | 10/1962 | Smirl | 192/70.18 |
| 3,170,551 | 2/1965 | Cook | 192/70.3 X |
| 3,712,436 | 1/1973 | Rist | 192/89 B |

FOREIGN PATENT DOCUMENTS 1,213,220  10/1959  France .............................. 192/70.29

*Primary Examiner*—Allan D. Herrmann
*Attorney, Agent, or Firm*—Diller, Brown, Ramik & Wight

[57] ABSTRACT

The invention relates generally to an assembly unit for a clutch, especially for automobile vehicles, and comprising an annular cover, a pressure-plate fixed for rotation with the cover and movable axially with respect to this latter, an elastic diaphragm with controllable action interposed between the cover and the pressure-plate and tending especially to move this plate away from the cover, a friction-disc adapted to be coupled for rotation with a first or driven shaft, and a reaction-plate intended to be coupled to a second or driving shaft, the assembly unit being adapted for fixing by the periphery of the cover on the reaction-plate so as to effect a controlled gripping of the friction-disc between the pressure-plate and reaction-plate, the cover periphery comprising radial fixing zones; the cover is provided at positions along its periphery with spacing members which project from the fixing zones, these members being fixed permanently on the cover periphery and extending substantially radially, each spacing member having a supporting surface by which it is intended to come into contact with the associated reaction-plate.

33 Claims, 47 Drawing Figures

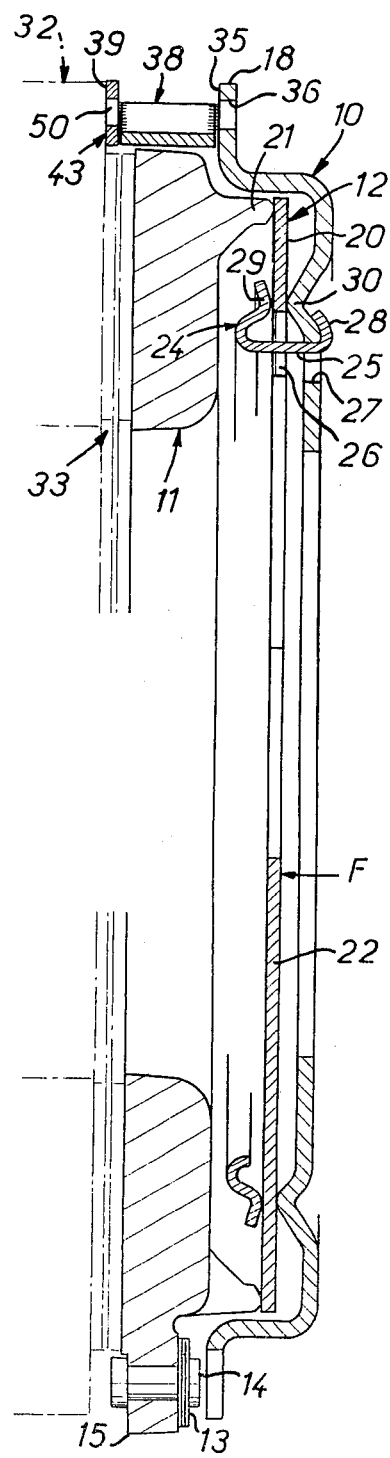
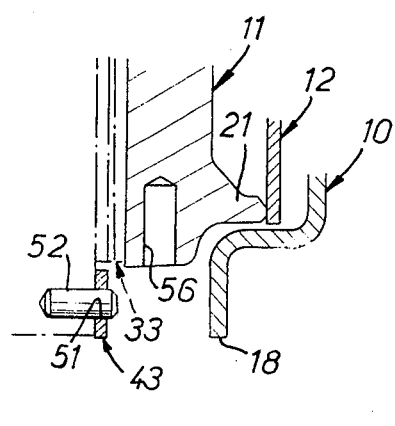
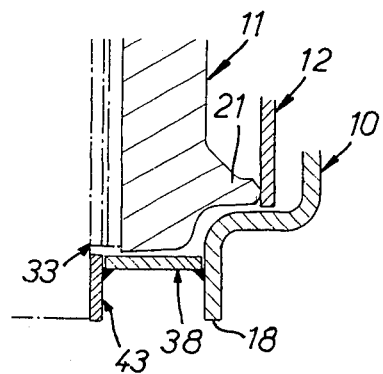
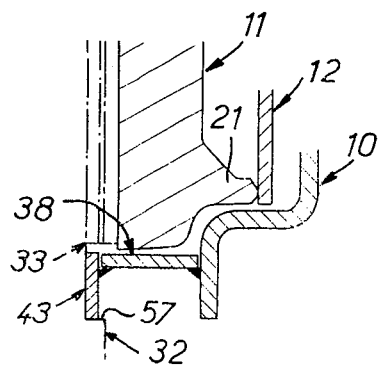

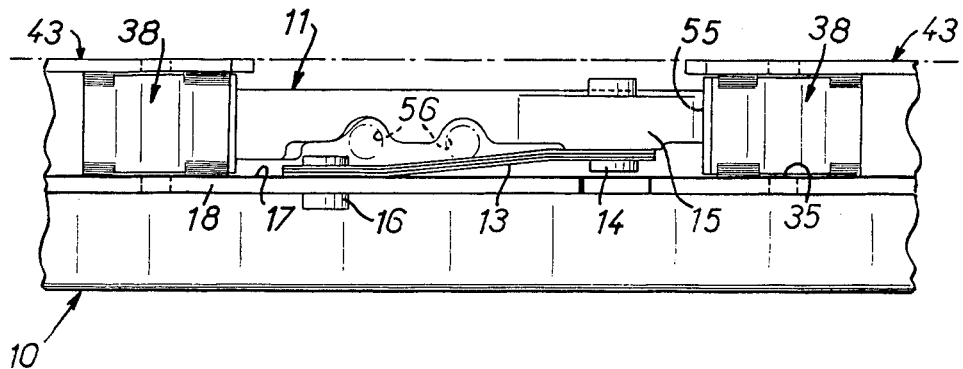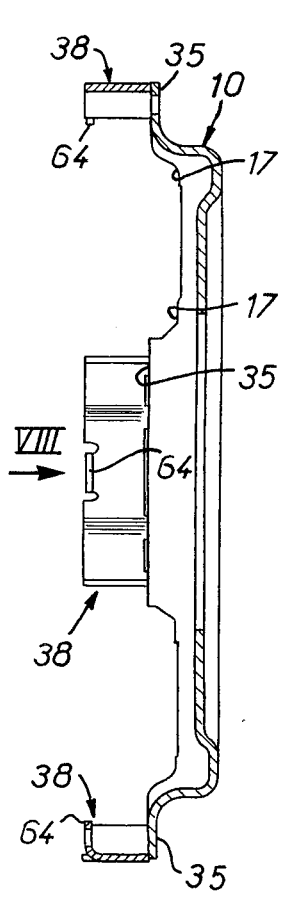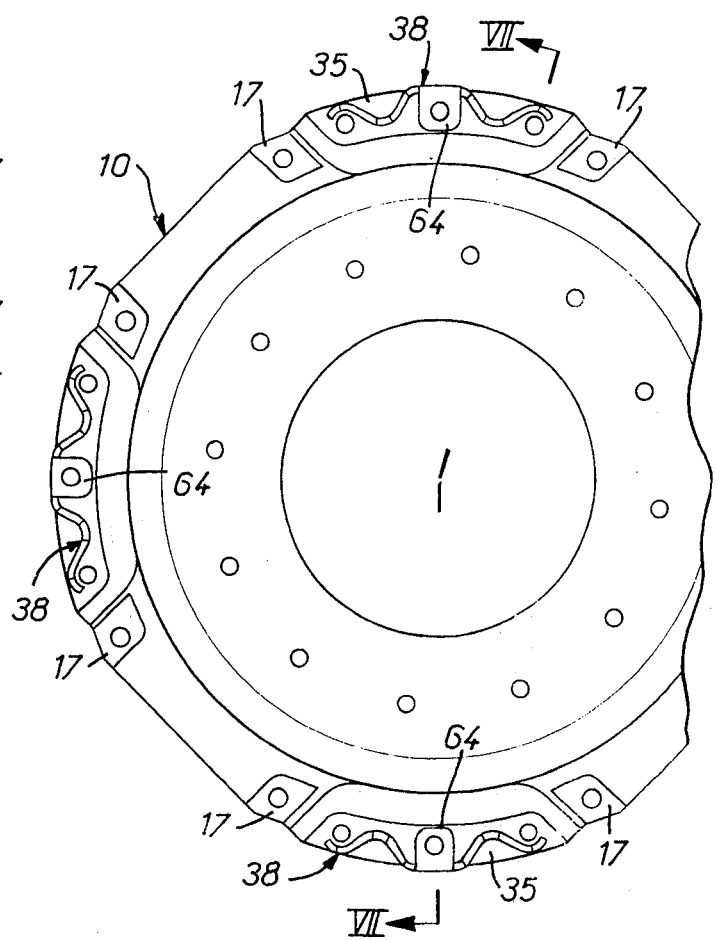

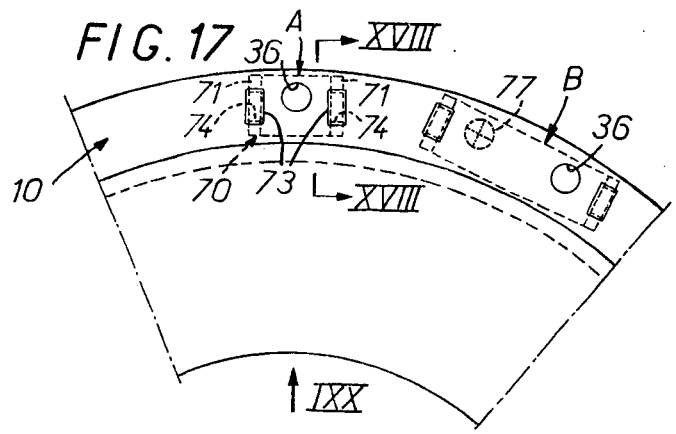
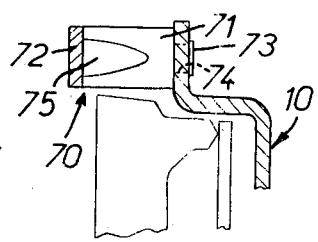
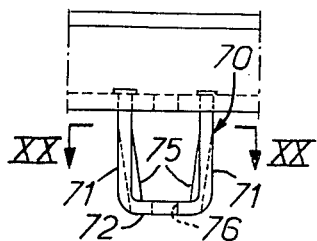
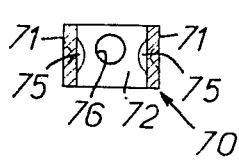
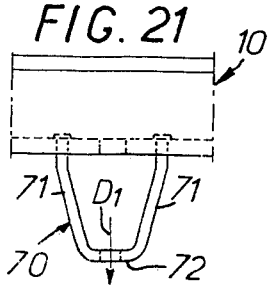
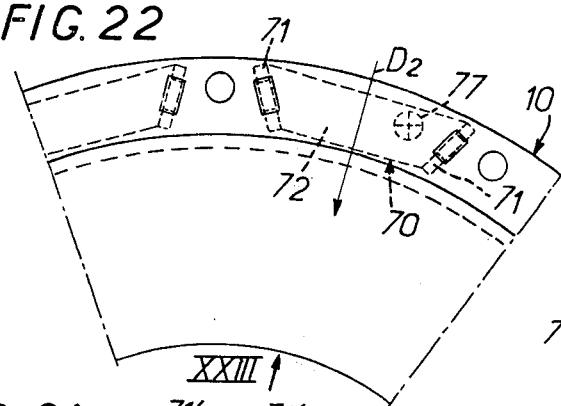
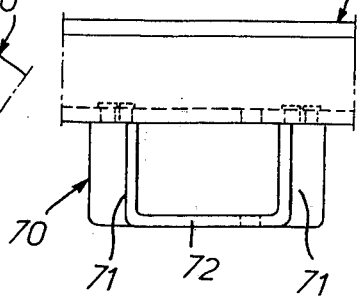
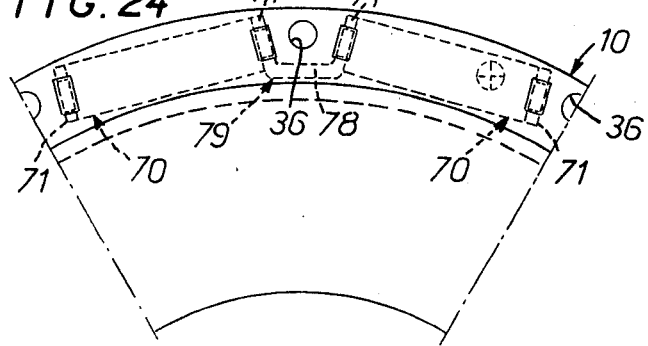

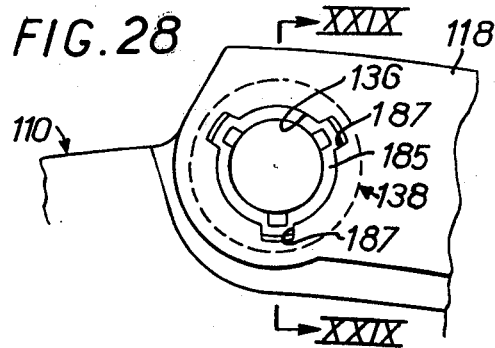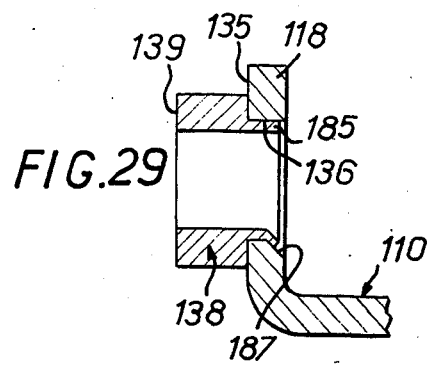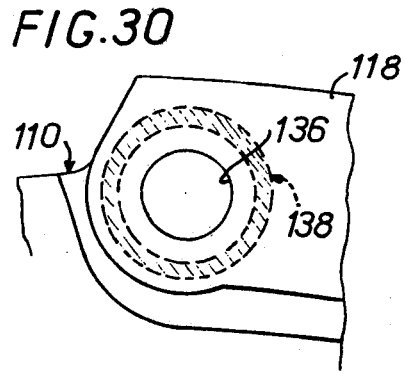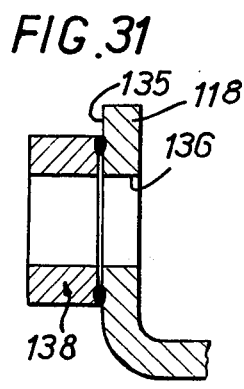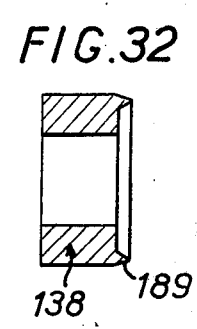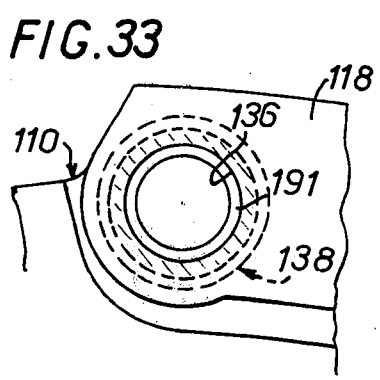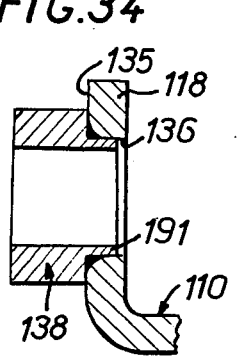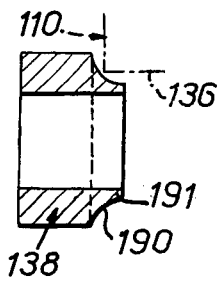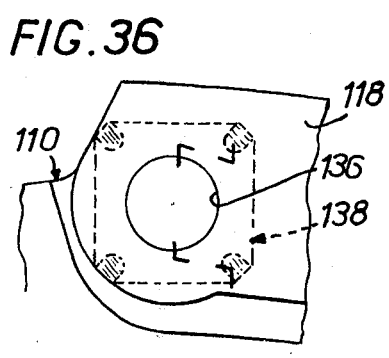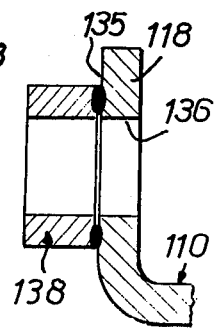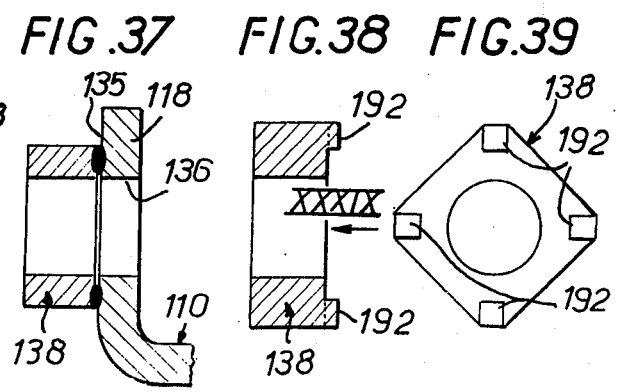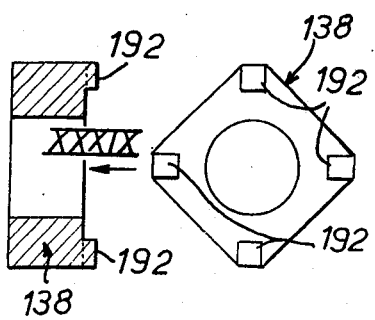

ASSEMBLY UNIT FOR A CLUTCH, ESPECIALLY FOR THE CLUTCHES OF AUTOMOBILE VEHICLES

The present invention relates generally to clutches, particularly intended for the equipment of automobile vehicles, and comprising especially an annular member known as a cover, a first plate known as the pressure-plate, which is fast for rotation with the said cover and which is movably mounted axially with respect to the cover, elastic means with controllable action interposed between the said cover and the said pressure-plate and especially tending to move this latter away from the said cover, a friction-disc intended to be coupled for rotation to a first shaft, generally a driven shaft, and a second plate known as the reaction-plate, intended to be coupled to a second shaft, gennerally a driving shaft.

The elastic means interposed between the cover and the pressure-plate normally urge this latter in the direction of the reaction-plate, and there is therefore normally a gripping action on the friction disc interposed between these plates, the cover being furthermore fixed by its periphery to the reaction-plate. Under these conditions, the driven shaft is coupled for rotation with the driving shaft.

In order to disconnect the driven shaft from the driving shaft, or in other words to declutch, it is necessary to free the friction-disc and for that purpose to permit a suitable retraction of the pressure-plate by appropriate action on the elastic means which urge the pressure-plate.

It has already been proposed to assemble conjointly the cover, the pressure-plate and the elastic means with controllable action interposed between these two members so as to constitute a unit assembly ready to be subsequently mounted directly as such on the associated reaction-plate.

Now, the reaction-plates on which such unit assemblies are to be transferred are essentially of two distinct types.

First of all, and in practice this is the most frequent case, there are reaction-plates provided, around the surface against which the friction-disc comes to bear, with a generally cylindrical shirt forming with this surface a blind housing in which, in addition to the friction-disc, there is arranged the pressure-plate coupled to the cover, this cover being furthermore fixed to the reaction-plate by the free edge of the skirt of this plate.

There are in addition reaction-plates which are not provided with a cylindrical skirt of this kind, which considerably facilitates the machining of the face of this plate against which the friction-disc is applied.

In this case however, the cover to be fixed on the reaction-plate must be shaped in such manner as to form with this plate the housing suitable for receiving the friction-disc and the pressure-plate.

The result is that a cover of this kind has necessarily at the present time a different shape, depending on whether it is to be associated with a plate provided with a cylindrical skirt or with a plate not having such a skirt, which globally increases the cost of manufacture, of storage and of handling of these covers.

The present invention has generally for its object an arrangement enabling this disadvantage to be obviated, and having in addition other advantages.

More precisely, the present invention has especially for its object a unitary assembly for a clutch, especially for an automobile vehicle, of the kind comprising an annular member known as the cover, and a plate known as the pressure-plate, which is fast for rotation with the said cover and which is movably mounted axially with respect to this cover, and elastic means with controllable action interposed between the said cover and the said pressure-plate, and tending especially to move this plate away from the said cover, the said unitary assembly being intended to be fixed by the periphery of the cover, on a second plate known as the reaction-plate, for a controlled gripping of a friction-disc between the said plates, and the said periphery of the cover being provided for the purpose of its fixing on the reaction-plate, with substantially radial fixing zones, such a unitary assembly being characterized in that the said cover carries here and there on its periphery, projecting from the said fixing zones, spacing members which are fixed on the said periphery and which extend generally substantially axially, each spacing member having, at a distance from the fixing zone from which it projects, a supporting surface by which it is adapted to come into contact against the associated reaction-plate.

The present invention has further for its object a clutch, especially for an automobile vehicle, comprising such a unitary assembly.

When the cover of this unitary assembly is equipped accorrding to the invention with spacing members which are rigidly fixed thereto, it is adapted to be mounted on a flat reaction-plate, that is to say on a reaction-plate not having any cylindrical skirt.

However, these same covers are thus also adapted, when no spacing members are fixed on them, to be fixed on a hollow reaction-plate, that is to say on a reaction-plate which carries a cylindrical skirt.

Thus, covers of this kind can be employed indifferently for flat or hollow reaction-plates, depending on whether or not the spacing members provided according to the invention are fixed on them.

The advantageous result of this arrangement is an overall economy in the cost of manufacture.

In addition, when according to the invention the cover is equipped with spacing members, these spacing members advantageously form openings with each other, which facilitate, after assembly, the passage of the tools necessary for the radial perforation of the pressure-plate, which is usually carried out in order to perfect the rotational balancing of the unit, and which ensures during operation good internal ventilation of this assembly.

Finally, due to the arrangement according to the invention, the screw heads or threaded tie-rods necessary for fixing the cover on the associated reaction-plate are advantageously displaced axially beyond the pressure-plate with respect to the reaction-plate and, all other conditions remaining equal furthermore, it is then possible, as compared with comparable clutches known at the present time either advantageously to give a smaller diameter to the cover for the same diameter of pressure-plate, or, for the same diameter of cover, to give the pressure-plate advantageously a larger diameter.

The characteristic features and advantages of the invention will furthermore be brought out in the description which follows below by way of example, reference being made to the accompanying diagrammatic drawings, in which:

FIG. 2 is a view in axial section of this assembly unit, taken along the broken line II-II of FIG. 1;

FIGS. 3 and 4 are partial views in axial section of this assembly unit, taken respectively along the lines III—III and IV—IV of FIG. 1;

FIG. 5 is similar to FIG. 4 and relates to an alternative form of construction;

FIG. 6 is a partial view in plan of the assembly unit shown in FIG. 1, taken in the direction of the arrow VI of FIG. 1;

FIG. 7 is a view in axial section of a cover for an assembly unit according to the invention, following an alternative form of construction of this assembly unit, this axial section being made following the broken line VII—VII of FIG. 8;

FIG. 8 is a partial view in elevation of this cover in the direction of the arrow VIII of FIG. 7;

FIG. 17 is a partial view in elevation of the cover only of an assembly unit for a clutch according to the invention, following another alternative form of construction;

FIG. 18 is a view in axial section taken along the line XVIII—XVIII of FIG. 17;

FIG. 19 is a partial side view in the direction of the arrow XIX of FIG. 17;

FIG. 20 is a view in cross-section taken along the line XX—XX of FIG. 19;

FIG. 21 is a view similar to that of FIG. 19 and is concerned with alternative form of embodiment;

FIGS. 22 and 23 are views respectively similar to those of FIGS. 17 and 19 and relate to another alternative form of embodiment;

FIG. 24 is a view similar to that of FIG. 17 and concerns another alternative form of construction;

FIG. 28 is a partial view in elevation to a larger scale, similar to that of FIG. 25 and is concerned with an alternative form of construction;

FIG. 29 is a view in cross-section of this alternative form taken along the line XXIX—XXIX of FIG. 28;

FIGS. 30 and 31 are respectively similar to FIGS. 28 and 29 and relate to another alternative form of construction;

FIG. 32 is a view in axial section of the ring constituting a spacing member in the alternative form of embodiment shown in FIGS. 30 and 31;

FIGS. 33, 34 and 35 are respectively similar to FIGS. 30, 31 and 32, and relate to another alternative form of construction;

FIGS. 36, 37 and 38 are respectively similar to FIGS. 30, 31 and 32, and relate to another alternative form of construction;

FIG. 39 is a plan view of the ring constituting a spacing member in the alternative form of construction shown in FIGS. 36 and 37, following the arrow XXXIX of FIG. 38;

Figure 1:
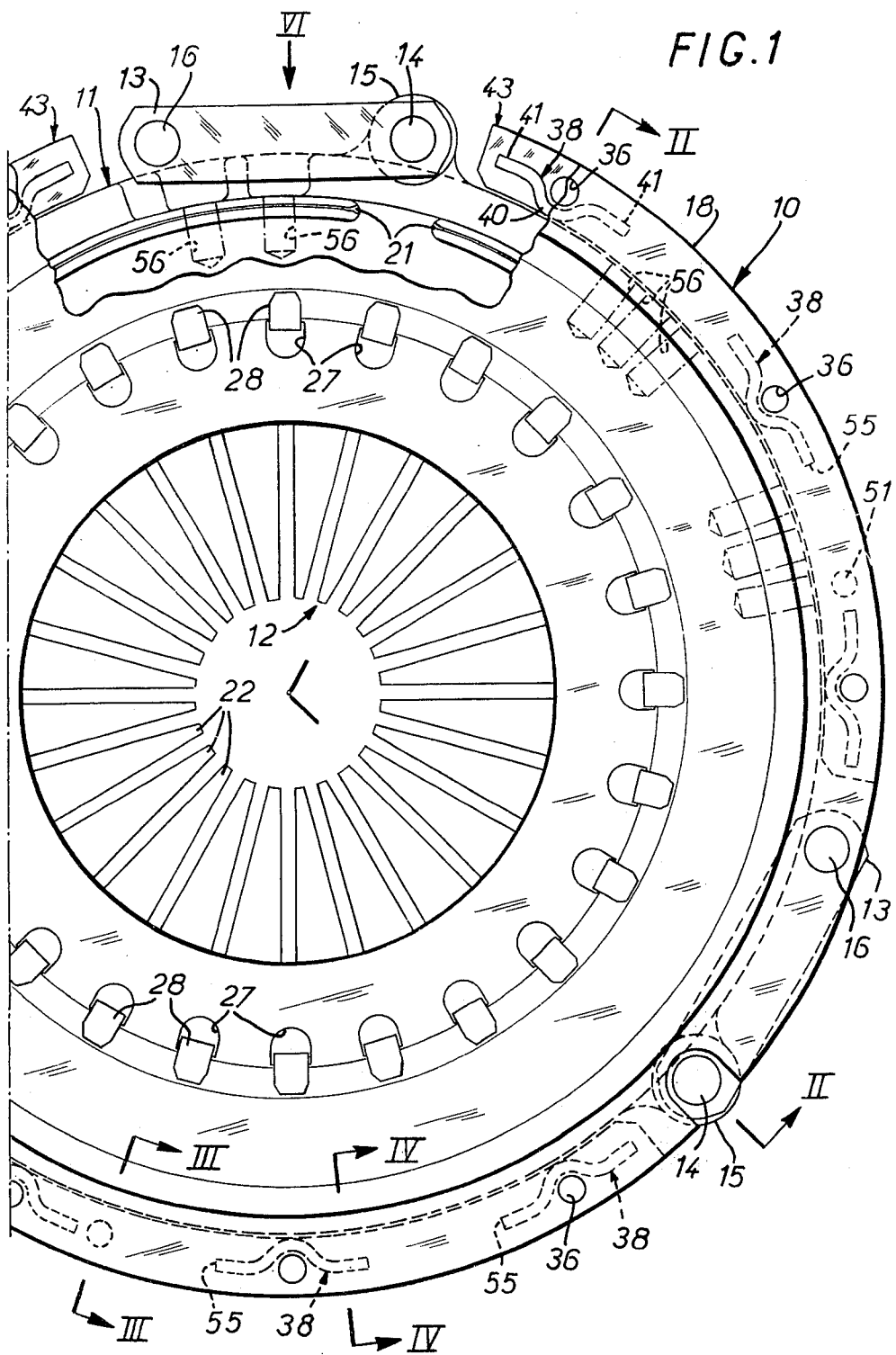
FIG. 1 is a partial view in elevation with parts broken away locally, of a unitary assembly for a clutch in accordance with the invention.
Figure 11:
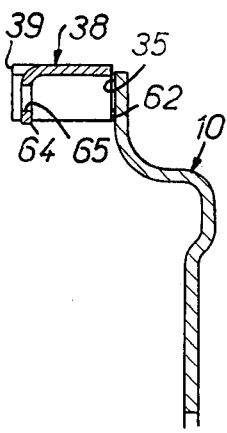
FIGS. 10 and 11 are views in axial section of the cover shown in FIG. 9, taken respectively along the lines X—X and XI—XI of this FIG. 9.
Figure 10:
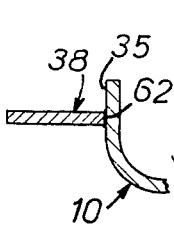

In accordance with the form of embodiment shown in FIGS. 1 to 4, the assembly unit for a clutch according to the invention comprises as a whole, in a manner known per se, a first annular member 10 known as the cover, a second annular member 11 forming a plate known as the pressure-plate, which is fixed for rotation to the cover 10 and which is movably mounted axially with respect to this latter, and elastic means 12 with controllable action, which are interposed between the cover 10 and the pressure-plate 11 and which normally tend to move the cover 10 away from the pressure-plate 11.

In a manner known per se, the pressure-plate 11 is made fast for rotation with the cover 10 by tangential tongues 13 which extend substantially tangentially from the pressure-plate 11 to the cover 10 at points circularly distributed on these two annular members, three in number in the example shown.

These tangential tongues are on the one hand riveted at 14 on the pressure-plate 11 by means of lugs 15 forming radial extensions of the plate for that purpose, and on the other hand riveted at 16 on the cover 10 through the intermediary of fixing zones 17 (see FIG. 6) formed for that purpose on the corresponding surface of a peripheral ledge 18 extending the cover 10 radially all round the cover.

In the example shown an in known manner, the elastic means 12 with controllable action, interposed between the cover 10 and the pressure-plate 11 are constituted by a diaphragm, that is to say by an annular member 20 forming an elastic washer of the Belleville type, supported at its outer periphery on the pressure-plate 11, by means of a circular bead 21 projecting from the corresponding face of the plate and mounted rockably at its internal periphery on the cover 10, the said angular member 20 comprising, in the direction of the axis of the unit, radial extensions 22 which form declutching fingers.

In the example shown in a manner know per se, this diaphragm 12 is rockably mounted on the cover 10 by means of an annular ring 24 coupled to the cover 10 by fingers 25 which pass axially first of all through the diaphragm 12 by means of passages 26 formed at the roots of its declutching fingers 22, and then through the cover 10 by means of passages 27 formed for that purpose in the cover and which, beyond the cover 10, are bent back at 28 at the contact with the cover.

This annular ring 24 has a rounded deformation 29 in contact with one face of the diaphragm 12, and maintains this diaphragm 12 in contact by the other of its faces with a rounded deformation 30 formed for that purpose in the cover 10.

An assembly unit of this kind is intended to be fixed by the peripheral ledge 18 of the cover 10 to a reaction-plate 32, for gripping a friction-disc 33 between this reaction-plate 32 and the pressure-plate 11.

A pressure-plate 32 of this kind, which is generally intended to be fixed for rotation on a driving shaft, and the associated friction-disc 33, which is generally intended to be fixed for rotation on a driven shaft, have only been indicated diagrammatically in broken lines in FIG. 2.

These parts are in fact well known by themselves, and as they do not form part of the invention, they will not be described in detail here.

It will be sufficient to emphasize that the reaction-plate 32 is of the flat type, that is to say the periphery of this plate is located substantially in the radial extension of the surface of this plate against which the friction-disc 33 is capable of coming into contact.

In known manner, the cover 10 is provided here and there on its peripheral ledge 18, with radial fixing zones 35 pierced with passages 36 intended for the mounting in position of any fixing members such as screws or the like (not shown) intended to ensure its fixing on the reactionplate 32.

In the example shown in FIGS. 1 to 4, the fixing zone 35 are axially at the same level as the fixing zone 17, to which the tangential tongues 13 are coupled and they are circularly in continuity with these fixing zones.

According to the invention, the cover 10 carries, projecting from these fixing zones 35, spacing members 38 which are fixed on the said periphery and which extend globally substantially axially, each of these spacing members 38 being provided, at a distance from the fixing zone 35 from which it projects, with a supporting surface 39 by which it is intended to come into contact with the associated reaction-plate.

In the example of construction illustrated by FIGS. 1 to 4, a spacing member 38 of this kind is constituted by a small metal plate having parallel to the axis of the cover a deformation 40 which has generally the shape of a half-wave, the said deformation turning at a distance round the corresonding passage 36 of the cover and being extended laterally and on each side by rings 41 which extend substantially circumferentially. In the example shown in FIGS. 1 to 4, a half-wave deformation of this kind extends cylindrically over the whole axial length of the spacing member with which it is associated, from one of the end transverse edges of such a spacer to the other.

In the example shown, the facing member are welded to the cover 10 by their corresponding transverse end edge.

Also in the example illustrated, these spacing devices 38 carry, at a distance from the fixing zones 35 on which they form projections, supporting plates 43 which extend radially and form their supporting surface 39.

Finally in the example shown, the supporting plates 43 are in the form of a circular sector and join together circularly at least two spacing members 38, and in practice three in the example shown.

It will be understood that the distance between a fixing zone 35 of the cover 10 and the supporting surface 39 formed by the supporting plate 43 is the same for all the spacing members 38.

Furthermore, in addition to the passages 50 formed in correspondence with the passages 36 provided on the cover 10 for putting fixing members in position, each supporting plate 43 has at least one additional passage 51 intended to permit its engagement on a centering stud 52 carried for that purpose axially by the associated reaction-plate 32.

In the example shown, the supporting plates 43 are welded to the corresponding transverse end edges of the spacing members 38 on which they are carried.

When the cover 10 is fixed to the reaction-plate 32, the diaphragm 12 acts normally on the pressure-plate 11 in the direction of the reaction-plate 32 and the friction-disc 33 is thus normally gripped between these plates. The clutch is engaged and the driven shaft which it controls is fast for rotation with the associated driving shaft.

When an axial thrust is applied on the free extremities of the declutching fingers 22 of the disphragm 12, in the direction of the arrow F of FIG. 2, a rocking movement of the annular portion 20 of this diaphragm is produced between its supports, which causes the diaphragm to release the action which it normally applies on the pressure-plate 11.

As a consequence of this, the disc 33 is released; the clutch is freed and the driven shaft is disengaged from the driving shaft.

This process is furthermore well known in itself and will not be described in more detail here.

It will be noted that the spacing members 38 according to the invention form between them openings 55 (see FIG. 6) which facilitate the passage of the tools necessary for radial perforation of the pressure-plate 11 for the purpose of rotational balancing of the unit. The radial perforations 56 thus obtained are shown in FIG. 3 and are shown diagrammatically in broken lines in FIGS. 1 and 6.

In addition, the openings 55 ensure in operation a good internal ventilation of the unit.

It will also be known that, by virtue of the presence of the spacing members 48 according to the invention, the heads of the fixing devices (not shown) utilized for fixing the cover 10 to the reaction-plate 32 are advantageously displaced axially beyond the pressure-plate 11 with respect to the reaction-plate 32 and that in consequence, all other conditions remaining equal furthermore, the pressure-plate 11 may have radially a greater development, this development being only limited by the central rods of these fixing members, taking no account of the relatively moderate thickness of the spacing members. In fact, these central rods lead in this respect to less grip than the heads which they carry, due to the fact that such a head must be associated with a not-negligible dead space for placing it in position and the insertion of a tool for turning it. As an alternative form, the conditions being again the same moreover, the cover 10 may advantageously have a smaller diameter.

According to the alternative form of embodiment illustrated by FIG. 5, the centering of the cover 10 on the reaction-plate 32 is effected by engagement of the supporting plates 43 carried by its spacing members 38, in a housing 57 formed slightly below the surface of the reaction-plate 32.

According to the alternative form of embodiment illustrated in FIGS. 7 to 11, a spacing member 38 comprises two deformations 40, 40' (FIG. 9) in the form of half-waves each passing round a passage 36 in the cover. As previously, these two half-wave deformations 40, 40' extend cylindrically over the whole axial length of the spacing member to which they belong, from one of the end transverse edges of such a spacer to another, such a cylindrical deformation having a generator line prallel to the axis of the cover.

These two half-wave deformations 40, 40' are arranged at the extremities of the corresponding spacing member and, by similar deformations 60, 60' but having opposite concavities, they are coupled to the central portion 61 of such a spacing member, which central portion is in the vicinity of the corresponding peripheral edge of the cover 10.

A spacing member 38 of this kind is preferably only fixed at points on the radial fixing zone 35 of the cover 10 from which it projects.

In the example shown in FIGS. 7 to 11, this fixing by points is carried out by welding between the corresponding edge of the spacing member concerned and the cover.

Figure 9:
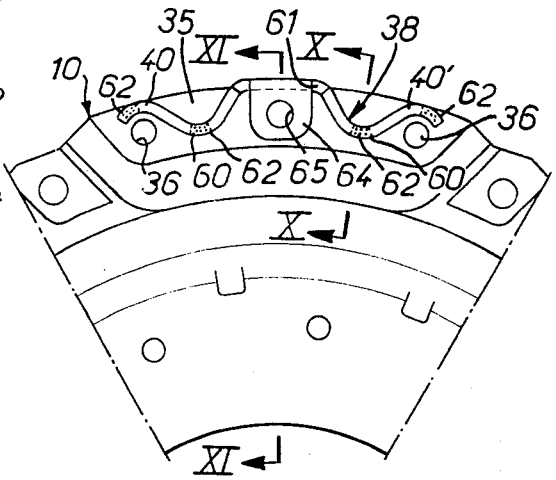
FIG. 9 represents a detail of FIG. 8 to a larger scale.

Such welding points are shown diagrammatically by zones 62 of rulded tint in FIG. 9; in practice they are close to the curvature zones of the half-wave deformations 40, 40' and 60, 60'.

In addition, in the example shown in FIGS. 7 to 11, each spacing member 38 comprises in its central zone a centering lug 64 which is formed in one piece with it and which extends substantially radially, parallel to the radial fixing zone 35 from which such a spacing member projects.

A centering lug 64 only extends circularly between two of the fixing points 62 by which this spacing member is fixed to the cover 10.

In addition, this centering lug 64 produced by suitable folding of the flat sheet from which the spacing member is made, is axially slightly recessed with respect to the supporting surface 39 also comprised by this spacing member.

In the example shown, this supporting surface 30 is formed by the part of the extreme free transverse edge of the spacing member 39 which flanks the centering lug 64 of this member, on each side of the centering lug.

The centering lug 64 of a spacing member 38 has a passage 65 intended to permit its engagement om a centering stud carried axially for that purpose by the associated reaction-plate (not shown in FIGS. 7 to 11) in a manner similar to that which has been described with reference to FIGS. 1 to 6.

Finally, in the example represented in FIGS. 7 to 11, the radial 17 provided on the cover 10 for fixing the tangential tongues 13 are axaially recessed with respect to the radial zones 35 of this cover from which project the spacing members 38, so that in this case, the peripheral ledge 18 of the cover is not at the same level along the length of its contour.

The putting into service of an alternative form of construction of this type is carried out as previously.

The fact that the centering lug 64 of a spacing member 38 is systematically provided recessed with respect to the supporting surface 39 of this spacing member enables the consequence of a possible irregularity of side to be obviated, due for example to the folding action by which this centering lug has been produced.

Figure 14:
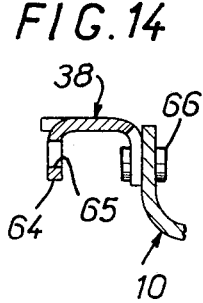
FIGS. 12, 13 and 14 are views respectively similar to FIGS. 9, 10 and 11, and concern an alternative form of construction.
Figure 13:
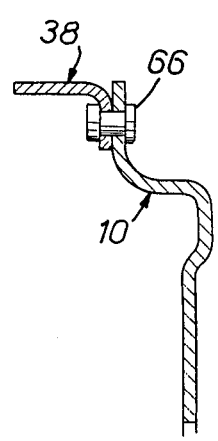
Figure 12:
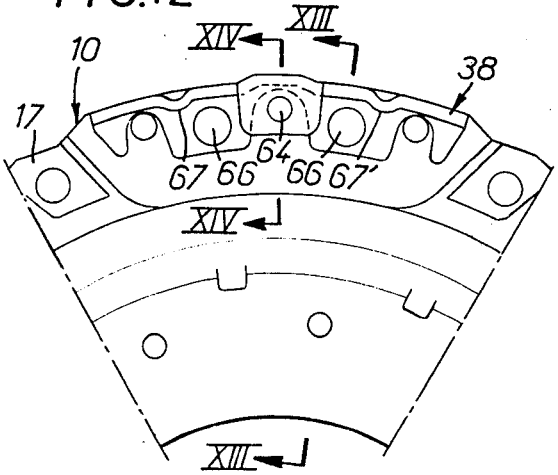

In accordance with the alternative form illustrated by FIGS. 12 to 14, the fixing by points of a spacing member 38 is effected by means of rivets 66.

In the example shown, this spacing member 39 does not comprise any very pronounced half-wave deformation as previously. It essentially follows the contour of the cover 10 in the vicinity of the peripherial edge of this cover, and is only provided with two stiffening ribs 67, 67' which extend substantially axially on each side of a radial centering lug.

Figure 16:
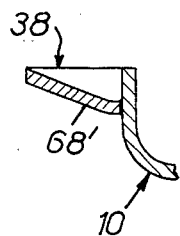
FIGS. 15 and 16 are views respectively similar to FIGS. 9 and 10 and relate to another alternative form of construction.
Figure 15:
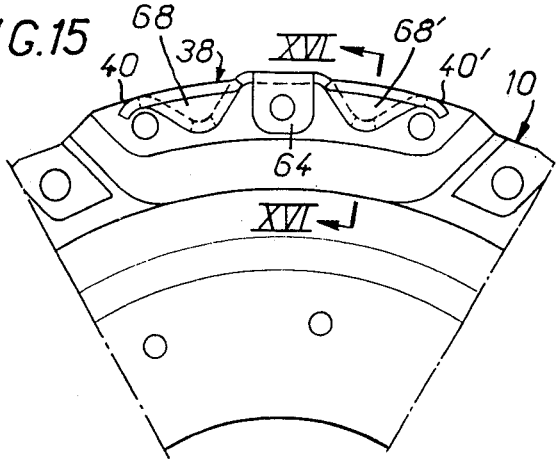

The alternative form of construction illustrated by FIGS. 15 and 16 is similar to that illustrated by FIGS. 7 to 11, but its half-wave deformations 50, 40' affect only that of its transverse end edges which is nesrest to the cover 10, that is to say that of its edges by which it is fixed to the cover.

On the other hand, the other of its end transverse edges which form its supporting surface is generally circular in the vicinity of the peripheral contour of the cover, faces which are oblique with respect to the axis 68, 68' coupling one of its edges to the other in the vicinity of the corresponding half-wave deformations.

According to the alternative forms of embodiment illustrated by FIGS. 17 to 24, the spacing members are associated in pairs, a single supporting plate joining two spacing members together circularly, and forming, conjointly with the spacers, a single piece 70 of U-shape, in which the wings 71 form the said spacing members while the central portion 72 forms the said supporting plate.

Each wing 71 of this U-shaped member 70 is extended by a lug 73 which passes through a passage 74 formed for that purpose in the cover 10 and which, beyond this cover, is hammered at the contact with the latter, which ensures the fixing of the said U-shaped member to the said cover.

In the form of embodiment shown if FIG. 17 to 20, the wings 71 of the U-shaped piece 70 are substantially parallel to the axial plane passing through the central zone of the associated central portion 72.

In order to reinforce the strength of such a U-shaped part 70 with respect to the circularly tangential force to which it is subjected in service and which has a tendency to push it down, its wings 71 each comprise over a portion of their height a deformation 75 in the shape of a quarter-olive which extends from their coupling zone to the associated central portion 72.

For the same purpose, and according to a first alternative form (see FIG. 21) at least the portion of the wings 71 of the U-shaped member 70 by which these wings are coupled to the associated central portion 72 is oblique on the axial plane passing through the central zone of this central portion 72, the oblique portions of the wing 71 converging towards each other in a direction D1 which is parallel to the axis.

In accordance with a second alternative form (see FIGs. 22 and 23) the wings 71 of the U-shaped member are oblique on the axial plane passing through the central zone of the associated central portion 72, the said wings 71 converging towards each other in a direction D2 which is perpendicular to the axis.

In any case, the wings 71 of the U-shaped member 70 are symmetrical with each other with respect to the axial plane passing through the central zone of the associated central portion 72.

In the preceding description, the utilization of the U-shaped members 70 may be carried out in two different ways, namely a first way shown in FIGS. 17 to 20 for example, in which the wings 71 of each U-shaped member 70 frame a passage 36 of the cover 10, which implies the use of a U-shaped member 70 of a type A, in which the central portion 72 forming a supporting plate is only provided with one passage 76 formed to correspond with the said passage 36, and of a U-shaped member 70 of a type B, having a greater length, in which the central portion 72 forming a supporting plate is provided not only with such a passage 76 but also with a passage 77 intended to permit its engagement on a centering stud carried for that purpose on the associated reaction plate (not shown in the drawings), and a second way (shown in FIGS. 22 and 23 for example) in which the U-shaped members 70, which are then all of the same type, are arranged away from the passages 36 of the cover 10, between these passages, the central portion 72 of these U-shaped members 70 being then provided with only one passage 77, in the case where such a passage is necessary.

In the first case, as the U-shaped members 70 are always in the immediate vicinity of the passages 36 of the cover 10, which is desirable, it is possible to utilize such U-shaped members irrespective of the diameter of the cover.

In the second case, it is preferably to choose U-shaped parts of different lengths according to the diameter of the cover.

In accordance with the alternative form of the embodiment illustrated by FIG. 24, two U-shaped members 70 form conjointly a single part 79, made in one single piece from a single sheet suitably cut-out and folded, this piece 79 comprising a coupling portion 78 connecting together the nearest wings 71' of the U-shaped members 70, these wings 71' framing a passage 36 of the cover 10.

According to an alternative form of construction (not shown), a spacing member according to the invention comprises two half-wave deformations arranged facing each other on each side of a passage 36 of the cover, and has thus generally the form of a tube.

In the foregoing text there have been described forms of construction of the spacing members according to the invention which are more particularly suitable for clutches intended for the equipment of heavy vehicles, for which the "hollow" of the reaction-plate, that is to say the axial length of its cylindrical skirt, may reach relatively large dimensions, greater than two or three centimeters for example.

In the text which follows, there will now be described a form of construction of the spacing members in question which is more particularly suitable for clutches intended for the equipment of touring vehicles, for which the possible "hollow" of the reaction-plate is relatively moderate and is most frequently less than 1 centimeter.

A spacing member of this kind is in this case constituted by a simple ring suitably fixed to the fixing zone on which it is carried and, as this latter is provided in the usual manner with an opening for the passage of a screw for fixing the unit to the associated reaction-plate, a ring of this kind preferably extends annularly round the said opening.

Such a ring constitutes in a particularly economic manner, a spacing member having, for the applications considered, a particularly reliable seating, its axial length being moderate compared with the supporting surface which it offers.

In FIGS. 25 and 26 there is again shown an assembly unit for a clutch of the type described above.

This assembly unit generally comprises a first annular member 110 known as a cover, a second annular member 111 forming a plate known as the pressur-plate, which is fast for rotation with the cover 110 by tangential tongues (not shown on the drawings), and which is movably mounted axially with respect to the cover by virtue of the possible play of these tongues, and elastic means 112 with a controllable action, which are interposed between the cover 110 and the pressure-plate 111 and which tend normally to move this latter away from the cover 110.

In the example shown, these elastic means 112 with controllable action are constituted by a diaphragm, that is to say by an annular member 120 forming an elastic washer of the Belleville type, and comprising, in the direction of the axis of the unit, radial extensions or declutching fingers 122.

The member 120 is supported at its outer periphery on the pressure-plate 111, and at its inner periphery it is rockably mounted on the cover 110 by means, in the example shown, of fingers 125 which start from the cover 110, pass axially through the diaphragm 112 by means of passages 126 formed at the roots of its declutching fingers 122, and which are curved back substantially at right angles at 129 in contact with an annular member 180 arranged beyond the diaphragm 112 with respect to the cover 110.

This annular member 180 is in contact by a rounded central portion 181 with the corresponding face of the annular portion 129 of the diaphragm 112, while by its opposite face this annular portion 120 is itself in contact with a rounded deformation 130 formed for that purpose in the cover 110.

Such an assembly unit is intended to be fixed by the peripheral ledge of the cover 110 to a reaction-plate 132 for gripping a friction disc 133 between this reaction-plate 132 and the pressure-plate 111.

To this end, the cover 110 is provided here and there on its peripheral ledge 118 with radial fixing zones 135 pierced with passages 136 intended for the placing in position of screws or other fixing devices 183.

As previously, the cover 110 carries, projecting from its fixing zones 135, spacing members 138 which are permanently fixed thereto and which extend generally substantially axially, each of these spacing members 138 comprising, at a distance from the fixing zone 135 from which it thus projects, a supporting surface 139 by which it is adapted to come into contact with the associated reaction-plate 132, which is of the flat type, that is to say which is not provided with any cylindrical peripheral skirt in the example shown.

In the examples shown in FIGS. 25 to 47, a spacing member 138 of this kind is constituted by a simple ring suitably fixed to the fixing zone 135 on which it is carried.

In practice and as shown, for each opening 136 which is provided in each fixing zone 135 for the passage of a screw 183, there is a ring 138 forming a spacing member, and this ring extends annularly around the corresponding opening 136.

According to the forms of embodiment illustrated by FIGS. 25 to 29, each ring 138 constituting a spacing member is fixed to the cover 110 by insetting.

To this end, a ring of this kind comprises a tubular axial extension 185 which is engaged in the corresponding opening 136 of the fixing zone 135 of the cover 110 with which it is associated, and which is inset in this opening by radial deformation towards the exterior.

Figure 25:
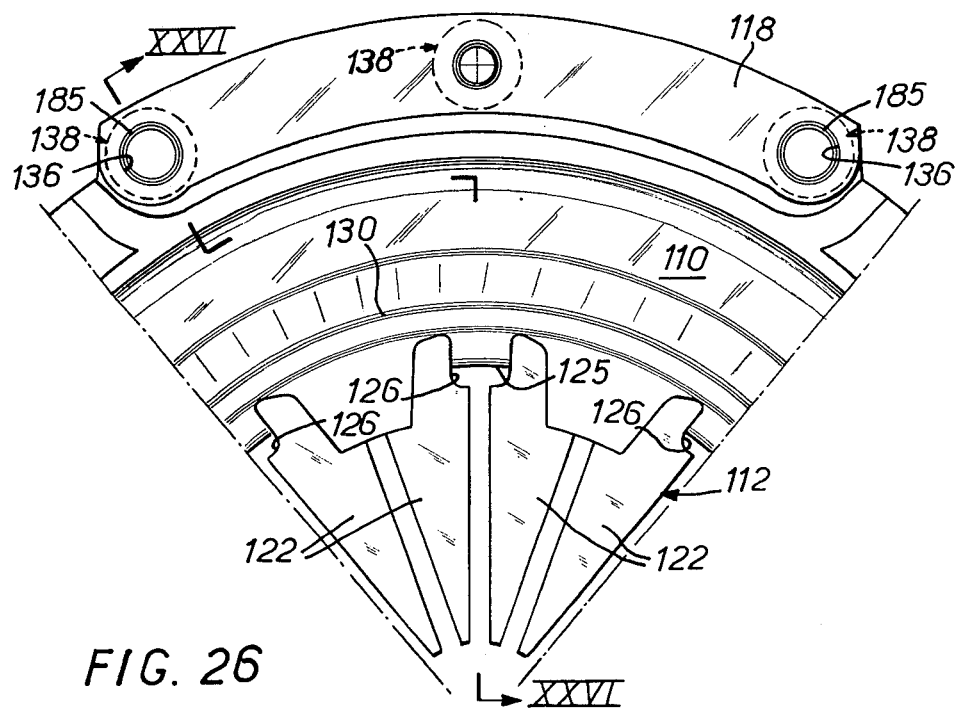
FIG. 25 is a partial view in elevation of another assembly unit for a clutch in accordance with the invention.
Figure 26:
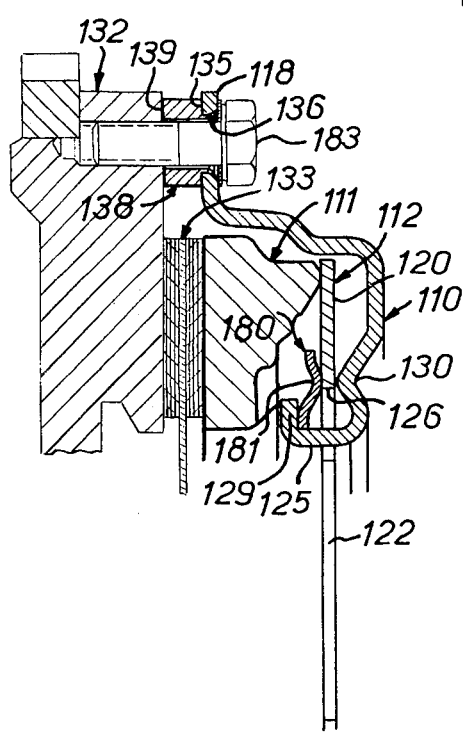
FIG. 26 is a view in axial section of this assembly unit taken along the broken line XXVI—XXVI of FIG. 25, showing in fine lines the other members of the clutch to which it belongs.
Figure 27:
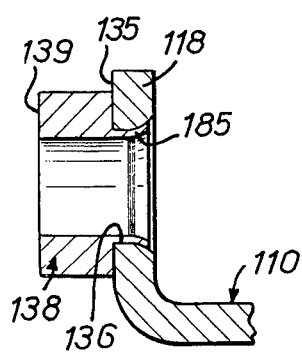
FIG. 27 represents a detail of FIG. 26 to a larger scale.
Figures 40, 41, 42, 43:
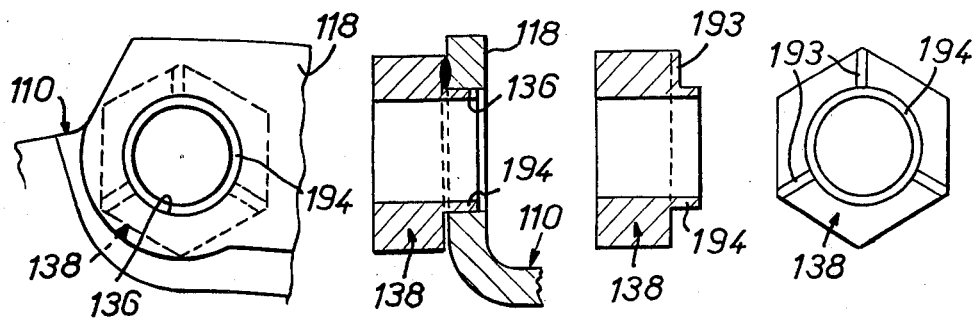
FIGS. 40, 41, 42 and 43 are respectively similar to FIGS. 36, 37, 38 and 39 and are concerned with another alternative form of construction.

In the example of construction illustrated by FIGS. 25 to 27, this radial deformation of insetting is associated circularly in a continuous manner to the whole of the corresponding axial extremity of the tubular extension 185 of a ring 138 forming a spacing member, the edge of the corresponding opening 136 being flared radially, by construction or under the action of insetting, from the face of the cover 110 under which such a ring is added to the other of the faces of this cover.

In an alternative form (see FIGS. 28 and 29), the radial deformation of insetting of the axial extension 185 of a ring forming a spacing member 138 is limited to a definite number of points, three in the example shown, uniformly distributed circularly, the edge of the corresponding opening 136 being provided locally for that purpose with shoulders 187 or a circularly continuous chamfer (not shown).

In accordance with the form of embodiment illustrated in FIGS. 30 to 43, a ring constituting a spacing member 138 is fixed by welding to the corresponding fixing zone 135 of the cover.

According to the form of application illustrated by FIGS. 30 to 32, and following the methods known in themselves, a ring of this kind comprises for that purpose, on that of its faces by which it is to be fixed on the cover 110, a circularly continuous welding edge 189.

It is this edge which, by fusion during welding, supplies the welding material necessary for fixing a ring of this kind to the cover 110.

According to the alternative form illustrated by FIGS. 33 to 35, and following methods also known in themselves, this supply of material is ensured by the peripheral portion 190 of an axial extension 191 of the ring forming a spacing member 138, this peripheral portion being shaped to a ring for that purpose, for co-operation with the corresponding and edge of the opening 136 of the associated cover 110.

According to another alternative form illustrated in FIGS. 36 to 38, the welding of the ring 138 constituting a spacing member is effected by points, this ring having projecting from its corresponding face studs 192, uniformly distributed peripherally, and intended to ensure by melting the supply of the necessary material.

This welding by studs which is known in itself, makes it possible to ensure a good seating for the corresponding ring, by choosing the relative location of these studs with respect to the fixing zone 135 on which it is fixed, taking account of the flatness of this zone.

In the example shown, this ring has peripherally a square contour, which makes it possible, by giving it during its assembly an appropriate angular orientation about the axis of the corresponding opening 136, to limit its overall diametral size, at least in certain directions.

In accordance with the alternative form of fixing by welding illustrated in FIGS. 40 to 43, the ring 138 forming a spacing member is also spot welded, but the supply of welding material is ensured by radial edges 193 provided for that purpose on the corresponding face of such a ring, and which extend radially from the external periphery of this ring to an axial extension 194 also provided on this ring for its centering on the corresponding opening 136 of the cover 110.

In the example shown, a ring of this kind has peripherally a hexagonal contour, and the welding edges which it comprises are three in number, these edges being uniformly distributed circularly at 120° from each other, starting from angle zones of such a contour. This solution avoids the fouling of the bore of the ring by welding material, which preserves the passage for a fixing screw in this bore.

Figures 44, 45:
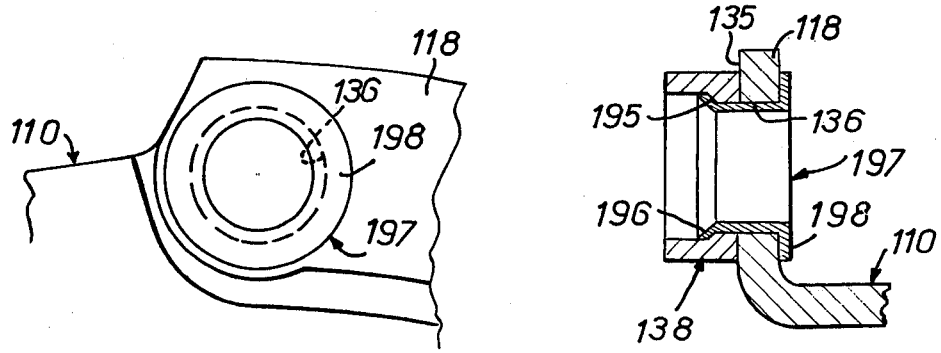
FIGS. 44 and 45 are respectively similar to FIGS. 28 and 29 and relate to another alternative form of construction.

According to the form of embodiment of the invention illustrated by FIGS. 44 and 45, a ring constituting a spacing member 138 is rigidly fixed to the cover 110 by riveting, this ring being provided in its internal bore with a shoulder 196 against which is inset, at least by points, the free axial extremity 196 of a tubular rivet 197 which is engaged in the corresponding opening 136 of the cover 110, and which is supported by an annular head 198 against the opposite face of the cover 110 round the said opening 136. In the example shown, the insetting of the extremity 196 of the rivet 197 is circularly continuous.

Figures 46, 47:
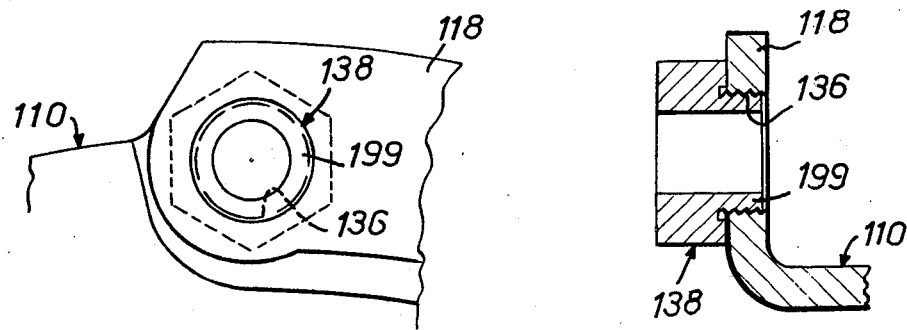
FIGS. 46 and 47 are respectively similar to FIGS. 28 and 29 and relate to another alternative form of construction.

In accordance with the alternative form of embodiment illustrated by FIGS. 46 and 47, a ring constituting a spacing member 138 is rigidly fixed by screwing to the cover 110, this ring comprising a tubular axial extension 199 which is externally threaded and which is engaged by screwing into the corresponding opening 136 of the cover suitably tapped for that purpose, or which is engaged by self-threading in this opening.

In the example shown, the ring forming the spacing member 138 has peripherally a hexagonal contour, as in the form of embodiment illustrated by FIGS. 40 to 43, especially for facilitating screwing.

It will be understood that the present invention is not limited to the forms of construction described and illustrated, but includes any alternative form of construction and/or of combination of their various parts.

In particular, the rings constituting the spacing members carried by the cover in the forms of embodiment of FIGS. 25 to 47 are not necessarily associated with the openings formed in the fixing zones of the peripheral ledge of the cover for the passage of screws, and/or certain of these may be arranged between such openings. For example, and as shown in FIG. 1, a ring of this kind may be associated with the opening provided in the peripheral ledge of the cover for its engagement on a centering stud.

It will further be noted that the cover of the assembly unit according to the invention lends itself advantageously to direct adaptation on a hollow reaction-plate, that is to say on a reaction-plate which carries peripherally a cylindrical skirt which projects axially. In this case it is only necessary that the spacing members should not be fixed on a cover of this kind.

What I claim is:

1. In a clutch assembly unit comprising an annular cover member and a pressure plate fixed to said cover member for rotation with and relative axial movement with respect to said cover member, resilient means interposed between said cover member and said pressure plate and normally tending to urge said pressure plate away from said cover member, a friction disc disposed between said pressure plate and a flat type reaction plate to be clamped therebetween; the improvement residing in said cover member for said flat type reaction plate essentially including a cover portion which may be fitted directly on a skirted reaction plate for enclosing a clutch assembly; and spacing members fixed along the periphery of said cover portion at spaced intervals and extending between the cover portion and said reaction plate generally parallel to the axis of rotation, said spacing members having supporting surfaces which bear against and are secured to said reaction plate.

2. An assembly unit as claimed in claim 1, wherein at least one said spacing member includes a generally half wave form portion when viewed parallel of rotation to the axis, said portion passing at a distance around a passage formed in said cover portion receiving a fastener securing said cover member to said reaction plate.

3. An assembly unit as claimed in claim 2, wherein one said half wave form portion is disposed on each side of said passage thereby defining a generally tubular portion.

4. An assembly unit as claimed in claim 2, in which said half-wave form portion of said spacing member extends cylindrically over the whole axial length of said spacing member, from one of its extreme edges to the other, this cylindrical deformation having a generator line parallel to the axis of said cover.

5. An assembly unit as claimed in claim 2, in which said half-wave form portion of said spacing member affects only the extreme transverse edge of said member nearest to the cover, the other transverse edge of said spacing member being generally circular as the image of the peripheral contour of said cover, faces oblique with respect to the axis connecting one of its edges to the other in the vicinity of said deformation.

6. An assembly unit as claimed in claim 1, wherein said supporting surfaces are defined on supporting plates which are fixed at right angles to the rest of said spacing members which extend generally parallel to said axis.

7. An assembly unit as claimed in claim 6, wherein each said supporting plate is common to two circumferentially adjacent spacing members.

8. An assembly unit as claimed in claim 7, wherein each said supporting plate defines with its associated spacing members a one-piece U-shaped member having wings which define the spacing members per se and a central connecting portion which defines the supporting plate.

9. An assembly unit as claimed in claim 8, wherein the wings of said U-shaped member are substantially parallel to the median axial plane passing through the associated central connecting portion.

10. An assembly unit according to claim 9, wherein a quarter olive shaped deformation is provided in each said wing of said U-shaped member and extends over at least part of the axial extend of the corresponding wing from its central connecting portion.

11. An assembly unit according to claim 8, wherein said wings of the U-shaped members having oblique portions connection them to their associated central connection portions, said oblique portions converging towards said axis.

12. An assembly unit according to claim 8, wherein said wings of said U-shaped member are oblique relative to the median axial plane through the associated central connecting portion and coverage in a direction perpendicular to said axis.

13. As assembly unit according to claim 8, wherein said wings of the U-shaped members are symmetrical with respect to the axial median plane through the associated central connecting portion.

14. An assembly unit according to claim 8, wherein said wings of said U-shaped members are continued by lugs passing through passages in and hammered against said cover portion.

15. An assembly unit according to claim 8, wherein each said one-piece U-shaped member comprises a coupling plate connecting adjacent wings of said two consecutive spacing members.

16. An assembly unit according to claim 6, wherein said supporting plates are provided with a passage in registration with the corresponding passage in said cover portion for receiving fastening means.

17. An assembly unit according to claim 1, wherein centering studs are provided on said reaction plate for engagement with passages in said spacing members.

18. An assembly unit according to claim 1, wherein said supporting surfaces comprise, in part, transverse edges of said spacing members facing said reaction plate.

19. An assembly unit according to claim 1, wherein said spacing members are provided with centering lugs integral therewith, extending substantially radially and having a passage for receiving a centering stud extending from the associated reaction plate parallel the said axis.

20. An assembly unit according to claim 1, wherein said spacing members are fixed to said cover portion at discrete points only.

21. An assembly unit according to claim 20, wherein said centering lugs of said spacing members extend circumferentially between consecutive fixing points and is slightly recessed with respect to the associated supporting surface formed on said spacing member.

22. An assembly unit according to claim 2, wherein said half wave deformation extends along the entire axial extent of the corresponding spacing member.

23. An assembly unit according to claim 2, wherein said half wave form deformation is provided only at a transverse end of said spacing member immediately adjacent said cover portion, the opposed transverse end of said spacing member being generally part circular and corresponding to the peripheral contour of said cover portion, faces connecting said transverse ends of a said spacing member being inclined relative to said axis.

24. An assembly unit according to claim 1, further comprising tongues for coupling said pressure plate to said cover portion and extending substantially tangentially therebetween, means for fixing said tongues at their respective ends to said pressure plate and said cover portion; the surface of contact of said tongues on said cover portion are generally coplanar with the surfaces of contact of said spacing means on said cover portion, and coannular therewith.

25. An assembly unit according to claim 1, wherein said resilient means comprises an annular diaphragm spring member bearing against said pressure plate along its outer periphery and rockably mounted on its inner periphery on said cover portion, said annular diaphragm spring member having inwardly directed radial fingers for effecting rocking movement of said diaphragm spring member in response to an axial thrust applied against radially inner ends of said fingers.

26. An assembly unit according to claim 1, wherein said spacing members comprise ring members fixed to the cover portion.

27. An assembly unit according to claim 26, wherein contact surfaces on said cover portion in engagement with said ring members are provided with an opening for centering means so that said ring members are disposed annularly around their corresponding openings.

28. An assembly unit according to claim 27, wherein said ring members are crimped to said cover portion, said ring members are crimped to said cover portion, said ring members having tubular extensions which penetrate into corresponding openings in said cover portion on which they are crimped.

29. An assembly unit according to claim 26, wherein welds fix said ring members to said cover portion.

30. An assembly unit according to claim 27, further comprising tubular rivets fixing said ring members to said cover portions, one end of said tubular rivets crimped against corresponding shoulders in said ring members, said tubular rivets extending through the corresponding openings in said cover portion and bearing at their other end against the side of said cover portion facing away from said spacing members.

31. An assembly unit according to claim 27, wherein one end of said ring members is externally threadedly engaged in the corresponding openings in said cover portion.

32. A clutch for motor vehicle including an assembly unit according to claim 1.

33. A new article of manufacture comprising a clutch pressure plate assembly especially constructed for use with a flat type reaction plate said clutch pressure plate assembly including a cover member and a pressure plate conventionally assembled with said pressure plate in axial protruding relation with respect to said cover member for mounting on a reaction plate of the cup shaped or pot type, said cover member having a mounting flange with openings therein for fasteners to secure said cover member to a reaction plate, and spacing members fixed along said mounting flange in accordance with the position of said openings for spacing said mounting flange from a flat type reaction plate in accordance with said projection of said pressure plate with respect to said cover member.

* * * * *